United States Patent
Shaick (10) Patent No.: US 9,053,355 B2
(45) Date of Patent: Jun. 9, 2015

(54) SYSTEM AND METHOD FOR FACE TRACKING

(71) Applicant: QUALCOMM Technologies, Inc., San Diego, CA (US)

(72) Inventor: Ben-Zion Shaick, Zichron Ya'akov (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 14/507,678

(22) Filed: Oct. 6, 2014

(65) Prior Publication Data

US 2015/0086075 A1    Mar. 26, 2015

Related U.S. Application Data

(63) Continuation of application No. 12/492,538, filed on Jun. 26, 2009, now Pat. No. 8,855,360.

(60) Provisional application No. 61/083,077, filed on Jul. 23, 2008.

(51) Int. Cl.
*G06K 9/00*    (2006.01)

(52) U.S. Cl.
CPC .................................. *G06K 9/00255* (2013.01)

(58) Field of Classification Search
None
See application file for complete search history.

(56) References Cited

U.S. PATENT DOCUMENTS

| | | |
|---|---|---|
| 5,960,097 A | 9/1999 | Pfeiffer et al. |
| 6,038,337 A | 3/2000 | Lawrence et al. |
| 6,128,398 A | 10/2000 | Kuperstein et al. |
| 6,263,088 B1 * | 7/2001 | Crabtree et al. ............... 382/103 |
| 7,003,136 B1 * | 2/2006 | Harville ......................... 382/103 |
| 7,014,102 B2 | 3/2006 | Oohashi |
| 7,123,754 B2 * | 10/2006 | Matsuo et al. ................. 382/118 |
| 7,277,891 B2 | 10/2007 | Howard et al. |
| 7,362,368 B2 * | 4/2008 | Steinberg et al. ............. 348/349 |
| 7,433,495 B2 * | 10/2008 | Rui et al. ....................... 382/103 |
| 7,526,193 B2 * | 4/2009 | Minato et al. ................. 396/123 |
| 7,747,159 B2 * | 6/2010 | Uenishi ......................... 396/135 |
| 7,853,140 B2 * | 12/2010 | Sugimoto ..................... 396/296 |
| 7,912,363 B2 * | 3/2011 | Minato et al. ................. 396/123 |
| 8,005,271 B2 | 8/2011 | Kawada |
| 8,036,522 B2 * | 10/2011 | Vydhynathan et al. ....... 396/124 |
| 8,073,197 B2 * | 12/2011 | Xu et al. ........................ 382/103 |
| 8,130,243 B2 | 3/2012 | Sudo et al. |
| 8,144,199 B2 * | 3/2012 | Takenaka et al. ............. 348/169 |
| 8,184,855 B2 * | 5/2012 | Tong et al. ..................... 382/103 |
| 8,238,696 B2 * | 8/2012 | Dart et al. ..................... 382/305 |

(Continued)

FOREIGN PATENT DOCUMENTS

WO    WO-2006082430 A1    8/2006

*Primary Examiner* — Avinash J Yentrapati
(74) *Attorney, Agent, or Firm* — Knobbe, Martens, Olson & Bear, LLP (57) ABSTRACT

Improved face tracking is provided during determination of an image by an imaging device using a low power face tracking unit. In one embodiment, image data associated with a frame and one or more face detection windows from a face detection unit may be received by the face tracking unit. The face detection windows are associated with the image data of the frame. A face list may be determined based on the face detection windows and one or more faces may be selected from the face list to generate an output face list. The output face list may then be provided to a processor of an imaging device for the detection of an image based on at least one of coordinate and scale values of the one or more faces on the output face list.

20 Claims, 5 Drawing Sheets

(56) References Cited

U.S. PATENT DOCUMENTS

| | | |
|---|---|---|
| 8,855,360 B2 | 10/2014 | Shaick |
| 2004/0017930 A1* | 1/2004 | Kim et al. .................. 382/103 |
| 2005/0105765 A1* | 5/2005 | Han et al. .................. 382/100 |
| 2005/0129276 A1 | 6/2005 | Haynes et al. |
| 2005/0147278 A1* | 7/2005 | Rui et al. .................. 382/103 |
| 2005/0188013 A1* | 8/2005 | Rui et al. .................. 709/204 |
| 2005/0283328 A1* | 12/2005 | Tashev ...................... 702/94 |
| 2006/0170791 A1* | 8/2006 | Porter et al. .............. 348/231.3 |
| 2006/0177110 A1* | 8/2006 | Imagawa et al. .......... 382/118 |
| 2006/0203108 A1* | 9/2006 | Steinberg et al. .......... 348/239 |
| 2006/0280335 A1* | 12/2006 | Tomita et al. .............. 382/103 |
| 2007/0047941 A1 | 3/2007 | Iwane et al. |
| 2007/0058836 A1* | 3/2007 | Boregowda et al. ........ 382/103 |
| 2007/0122010 A1 | 5/2007 | Kitamura et al. |
| 2007/0223534 A1* | 9/2007 | Oki .......................... 370/486 |
| 2007/0263000 A1* | 11/2007 | Krupnik et al. ............ 345/473 |
| 2008/0025578 A1* | 1/2008 | Nozawa .................... 382/118 |
| 2008/0080743 A1* | 4/2008 | Schneiderman et al. .... 382/118 |
| 2008/0089560 A1 | 4/2008 | Li et al. |
| 2008/0170751 A1* | 7/2008 | Lei et al. .................. 382/103 |
| 2008/0181453 A1 | 7/2008 | Xu et al. |
| 2008/0181460 A1* | 7/2008 | Tamaru ...................... 382/103 |
| 2008/0240497 A1 | 10/2008 | Porikli et al. |
| 2008/0240503 A1* | 10/2008 | Okada et al. .............. 382/103 |
| 2008/0279424 A1 | 11/2008 | Berrani et al. |
| 2008/0284867 A1 | 11/2008 | Ishihara |
| 2008/0317295 A1* | 12/2008 | Koutaki .................... 382/118 |
| 2009/0128642 A1* | 5/2009 | Koh et al. .................. 348/208.11 |
| 2009/0189984 A1* | 7/2009 | Yamazaki .................. 348/161 |
| 2009/0245573 A1* | 10/2009 | Saptharishi et al. ........ 382/103 |
| 2010/0045799 A1* | 2/2010 | Lei et al. .................. 348/169 |
| 2010/0158325 A1 | 6/2010 | Piramuthu et al. |
| 2010/0266159 A1* | 10/2010 | Ueki et al. ................ 382/103 |
| 2010/0310120 A1* | 12/2010 | Keith et al. ................ 382/103 |
| 2011/0129121 A1* | 6/2011 | Corcoran et al. .......... 382/103 |
| 2012/0274777 A1* | 11/2012 | Saptharishi et al. ........ 348/159 |

* cited by examiner

SYSTEM AND METHOD FOR FACE TRACKING

CROSS-REFERENCE TO RELATED APPLICATIONS

This application is a continuation of U.S. application Ser. No. 12/492,538, filed on Jun. 26, 2009, which claims the benefit of U.S. Provisional Application No. 61/083,077, filed on Jul. 23, 2008, which are hereby fully incorporated by reference.

FIELD OF THE INVENTION

The present invention relates in general to face tracking within a frame and/or between frames for accurate determination of one or more faces while reducing power consumption for performing the task.

BACKGROUND OF THE INVENTION

Conventional systems allow for face detection to be performed in many ways. These conventional systems, however, often mischaracterize non-facial objects as faces. As a result, processing of the image data may be slowed and/or processing power may be increased.

Currently, there are a number of different methods for face tracking. Most of these methods attempt to reduce processing power by limiting the search area for face detection. Other methods use object matching filtering techniques instead of the face detection techniques. Yet other methods reduce the face searching area by pre-filtering the image data. However, the processing power consumption corresponding to the use of these techniques remains very high. Some of these techniques suffer from slow detection of new faces appearing in the image scene because the search area is limited. In addition, some of these techniques are rendered ineffective when there are a large number of faces in the image area, as they cannot accurately process the large number of faces.

Thus, there is a need in the art for systems and methods of improved face tracking to reduce power consumption and increase processing speeds.

BRIEF SUMMARY OF THE INVENTION

Disclosed and claimed herein, are systems and methods for face tracking during determination of an image by an imaging device. In one embodiment, a method for face tracking includes receiving image data associated with a frame, receiving one or more face detection windows from a face detection unit, the face detection windows associated the image data of the frame, determining a face list based on the face detection windows and selecting one or more faces from the face list to generate an output face list. The output face list is output to a processor of the imaging device for detection of an image based on at least one of coordinate and scale values of the one or more faces on the output face list.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

One aspect of the present invention relates to face tracking. As disclosed herein, a face tracking unit detects and tracks one or more faces simultaneously so that a device and/or user can focus and track a subject anywhere within the frame. By adding a face tracking mechanism to the output of face detection hardware, a list of potential faces is checked so that false faces may be detected and removed. In that fashion, face tracking may be based on a list of face coordinates and face scale. The present disclosure provides a low power face tracking system by decreasing the power and time required for face tracking in comparison to tracking based on pixels of an entire frame. An additional advantage is the reduction of the processing required with respect to face detection, by constraining the face detection system to actual faces according to one or more embodiments of the invention.

Description of the Exemplary Embodiments

Figure 1:
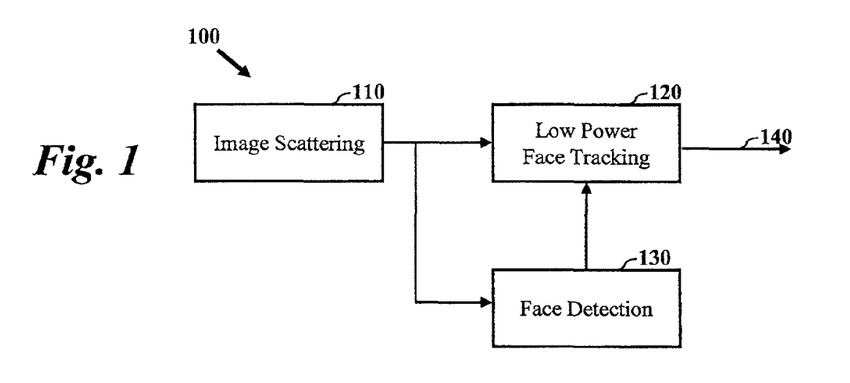
FIG. 1 depicts a face tracking system according to one embodiment of the invention.

FIG. 1 depicts one embodiment of a low power face tracking system. Face tracking system 100 includes image scatter unit (ISU) 110 configured to receive a data of a frame as input. Exemplary input to the system includes, but is not limited to, quarter video graphics array (QVGA), encoded image and/or movie data (e.g., YUV422) and compressed images (e.g., Y-only downscaled copies). ISU 110 may be coupled to at least one of a detection device and processor for receiving data for the one or more frames. As used herein, a frame may relate to an image window or detection area of an imaging device, such as a photosensor, camera, video detector, etc. In certain embodiments, data received by ISU 110 may relate to a preview image of the detector. A frame may also describe detection data for a particular period of time. ISU 110 may be configured to output the received frame data for a device display. Following receipt of one or more frames, ISU 110 is configured to provide the one or more frames to face detection unit (FD) 130 and low power face tracking unit (LPFT) 120.

In order to enable face detection with less power and reduced detection time, processing may be constrained to actual faces. In one embodiment, the system may employ a list of face coordinates and scale for tracking one or more faces. FD 130 is configured to provide potential face windows to LPFT 120. As is generally known, image capture and processing may be based on detection and focusing associated with the one or more windows within a frame. Based on one or more windows supported by the image detection device, face detection may be performed within the frame.

In order to improve processing, the output of FD 130 may be checked for detection and removal of false faces by LPFT 120. As used herein, false positives of false faces may relate to non-faces and/or regions in the frame classified incorrectly as faces by FD 130. For frames that have been processed by FD 130, the LPFT 120 may be configured to perform one or more of: removing the window(s) reported by FD 130 related to false faces, combining duplicated windows of a same face that was reported by the FD 130, and filling out detection holes in time. For frames in between detected frames, the LPFT 120 is to determine which of the previously detected faces are likely to stay in the current frame. Output of face tracking system 100, shown as 140, may be provided to a processor and or controller for an imaging device. The location of the face in between frames can be estimated from past detection(s) using a tracking filter such as a Kalman filter. The change in face size may be estimated in the same manner. If the time between the frames is too long, the tracking process may become problematic if the face is suddenly concealed by other objects in the foreground. In such a problematic case, a face "lifetime" quantity or factor may be introduced to determine how long the use of a face should be suspended before it is removed from the face list. That is, the "lifetime" quantity may be used to determine how long a particular unused face should be kept in the face list before it is removed from the face list.

In one embodiment, LPFT 120 may be configured to generate a single window and remove one or more false faces using filters over time. One example of such a time filter is a filter that matches the location of the face in a current frame relative to a previous frame and which subsequently removes the face from the face list in case the face motion is unstable due to fast face motion or unstable camera motion. A second example of a time filter is one that verifies the object as a face before listing it as one. In one embodiment, this may be accomplished by implementing an object detector confidence level that is averaged over time.

According to another embodiment of the invention, face tracking system 100 may employ a list or set of one or more faces to be tracked within a frame. LPFT 120 may be configured to provide a face list that may be used by an imaging device, such as a camera, including one or more confidence levels associated with a detected face. The face list may be based on the degree of confidence, as being a real human face, for each face in the face list. By reducing the number of faces in the face list, less processing power is required by the processing unit of the imaging device. As a result, face tracking system 100 can increase overall performance and reduce overall power consumption of the imaging device.

Although described as units of hardware in FIG. 1, it should be appreciated that the functions of the units may be implemented in a variety of ways including hardware, firmware, software, and combinations thereof.

Figure 2:
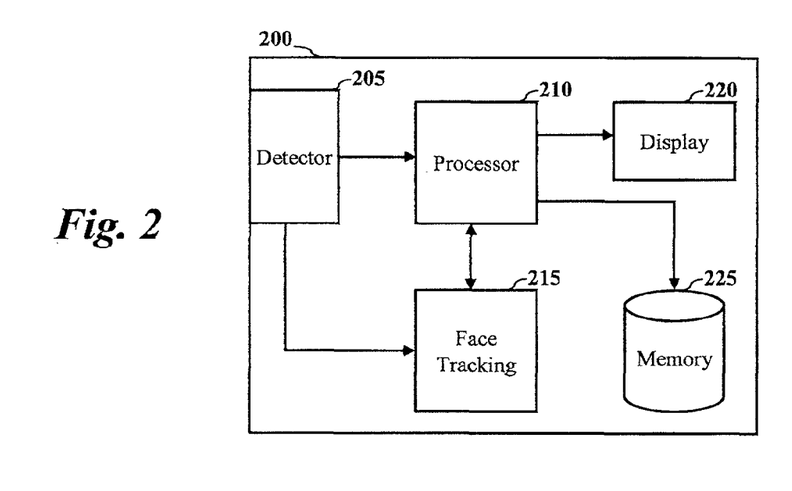
FIG. 2 depicts a simplified block diagram of an imaging device.

FIG. 2 is a block diagram of an imaging device 200 capable of implementing one or more aspects of the invention, including providing low power face tracking. Imaging device 200 may be implemented as a camera, video detector, scanning device and imaging device in general. As shown in FIG. 2, imaging device 200 includes detector 205 to provide image data to processor 210 and low power face tracking unit 215. In an alternative embodiment, face tracking unit 215 may receive image data from processor 210. Based on the image data received, face tracking system 215 may provide one or more signals to processor 210 to focus, display windows and/or detection of image data.

Processor 210 is coupled to display 220 which may be configured to display one or more frames. Displayed frames may relate to a preview of image data, including still images, motion images, video, and/or imaged data, determined by detector 205. As such, display 220 may be used to capture images by a user of an imaging. When display 220 outputs a preview, one or more detection windows may be displayed. Alternatively, or in combination, display 220 may output captured image data received from processor 210. Executable instructions and/or data captured by imaging device 200 may be stored by memory 225. Memory 225 may relate to one of a ROM and RAM memory. Imaging device may further include removable memory (not shown in FIG. 2), such as flash memory, for storage of imaging data.

Figure 3:
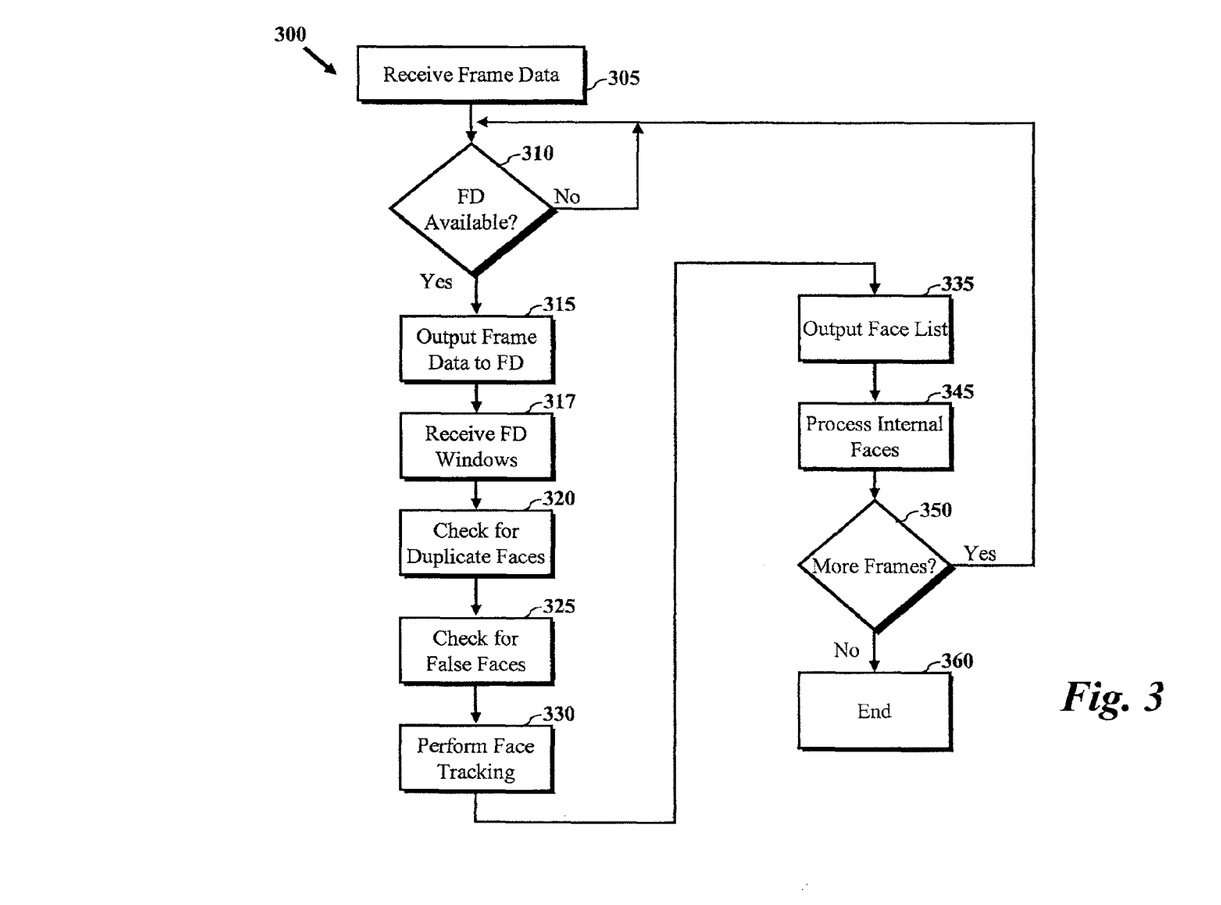
FIG. 3 depicts one embodiment of a process for low power face tracking according to one aspect of the invention.

Referring now to FIG. 3, depicted is a process for the operation of the low power tracking system of FIG. 1 according to one embodiment of the invention. Process 300 begins at block 305 when a frame is received. Following receipt of a frame, process 300 proceeds to block 310 to determine if the face detection unit (e.g., FD 130) is available for processing a frame. When the face detection unit is not available, (e.g., "NO" path out of decision block 310) the low power tracking system waits until the face detection unit is available to receive a frame. When the face detection unit is available, (e.g., "YES" path out of decision block 310) frame data is output to the face detection unit at block 317.

According to one embodiment of the invention, if a face list already exists in system 100, operation of the face detection unit is performed in parallel with processing of a face list. In such a case, the results from the face detection unit are combined as they are made available to facilitate processing. Thus, although process 300 is illustrated as a sequential description for convenience of explanation, it may be appreciated that acts of the process 300 may be processed in parallel when appropriate for system 100.

As shown in FIG. 3, process 300 continues by receiving the face detection windows and face data at block 315. As will be described below, face data provided by the face detection unit may indicate one or more faces and one or more false positives. The face data may be used to determine a face list associated with the received frame at block 305. Output of face data by the face detection unit may be a face list. At block 320, the low power face tracking unit (e.g., LPFT 120) checks for duplicate faces, such as faces that are in windows of approximately the same size and location. The face detection unit may produce duplicate faces based on the assumption that face detection unit reports many windows which may be a single face of an individual. At block 325, process 300 performs a check for detection of false positive detection of faces and/or objects that were wrongly reported as being a face. Process 300 may include removal of the detected false positive faces using filters, such as skin color filter which allows for removal of false faces that do not have human skin colors in normal and/or over- and under-exposed images. At block 330, the face tracking is performed to create an internal face list as will be describe in more detail below with reference to FIG. 4.

At block 335, an output faces list is created from the internal faces list and provided as an output of the system. The output face list does not include previously detected faces which no longer exist in the existing full list when one or more new faces exist. The internal face list is then processed at block 345 as will be explained in more detail below with respect to FIG. 5. Thereafter, process 300 determines if one or more additional frames are to be processed at decision block 350. When more frames are available (e.g., "Yes" path out of decision block 350) blocks 310-345 of process 300 may be repeated. When no additional frame data is to be processed (e.g., "No" path out of decision block 350), the face tracking process 300 may be completed at block 360.

Figure 4:
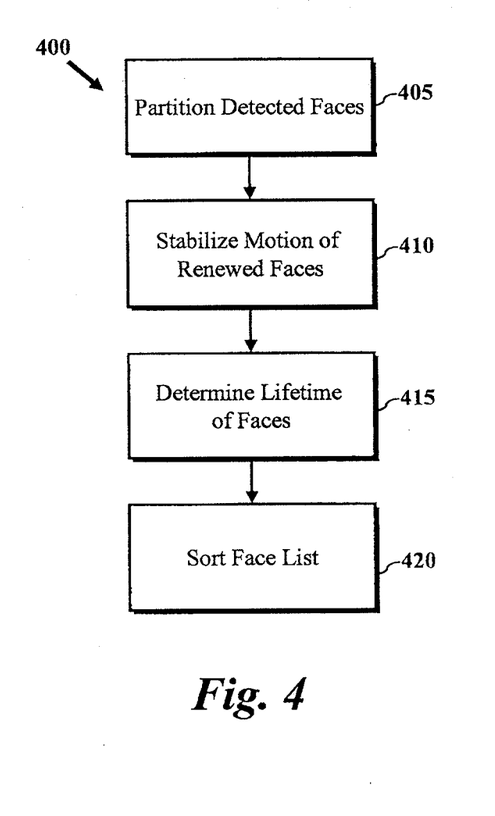
FIG. 4 depicts a process for creating an internal face list according to one embodiment of the invention.

Referring now to FIG. 4, a process is depicted for face tracking to create an internal face list according to one embodiment of the invention. Process 400 begins by partitioning a list of faces received from a face detection unit (e.g., FD 130) into one of three groups: new, renewed, and frozen. "New" relates to faces which are detected for the first time; "Renewed" relates to faces which detected in the current frame and at least once before; and, "Frozen" relates to faces which were previously detected but not in the current frame. Process 400 continues with motion stabilization of the renewed faces. The face detector may report the face location and size of the faces with some inaccuracy. This inaccuracy is most noticeable as small random movements when the face is fixed in the scene. The motion stabilization unit filters out such noisy movements. The motion stabilization filter may correct the face coordinates $(\tilde{x}_i, \tilde{y}_i)$ and spacial size $(\tilde{w}_i, \tilde{h}_i)$ in the current frame based on current frame i and previews frame i−1.

In one embodiment, the filter may be implemented as follows:

$$\tilde{w}_i = k_w \cdot w_i + (1-k_w) \cdot w_{i-1};$$

$$\tilde{x}_i = k_x \cdot x_i + (1-k_x) \cdot x_{i-1}, k_x = f(|x_i - x_{i-1}|/\tilde{w}_i;$$

$$\tilde{h}_i = k_h \cdot h_i + (1-k_h) \cdot h_{i-1}; \text{ and}$$

$$\tilde{y}_i = k_y \cdot y_i + (1-k_y) \cdot y_{i-1}, k_y = f(|y_i - y_{i-1}|/\tilde{y}_i).$$

Where k is an adjustable lifetime factor and $0 \leq k \leq 1$. When k=0, the filter operates at its maximum level; when k=1, the filter operates at its minimal level. In another embodiment, $0 \leq k_x, k_y, k_w, k_h \leq 1$. For example, $k_w, k_h$ may be set to 0.4 and $k_x, k_y$ is determined adaptively by function $f(\ )$ in such way that when the face is fixed (moving slowly) then the filter is at its most aggressive and when the face is moving relatively fast to its size then the filter is at its least aggressive for the purpose of better catching the moving face.

Thereafter, lifetime values may be determined at block 415 for new faces and/or extended to faces that continue to appear and therefore are determined as faces deserving a longer lifetime. In accordance with an embodiment of the invention face lifetime for new faces is determined by the following rules:

"New-faces" lifetime=$k_1 \cdot f(c) \cdot D$ where $k_1$ is adjustable lifetime factor. $0 \leq f(c) \leq 1$ is a function of the face detection confidence level. Larger values of lifetime values relate to higher confidence level. In one embodiment, the confidence level can be taken from the face detection unit. In another embodiment, the confidence level may be obtained by counting the number of a window's neighbors for the same face as described by combining duplicated faces (e.g., block 320). A higher number of windows can also relate to higher confidence level. D is the estimated detection time—the number of frames between the current frame (detection started) and the frame where detection ends. In the simplest implementation, D can be set to a previous detection time. In one embodiment, the detection time is about 66 msec or 2 frames in 30 fps stream. In accordance with an embodiment of the invention, face lifetime for renew faces is determined by the following rules:

"Renewed-faces" lifetime=MIN($k_3,(k_2 \cdot f(c) \cdot D$+lifetime)$\cdot g(v)$)

where $k_2$ is adjustable lifetime factor, and where in an exemplary implementation, $k_2 > k_1$. $0 \leq g(v) \leq 1$ is a function of current face motion velocity. Larger value should be given for lower velocity. MIN($v_1, v_2$) is function that sets the smaller value of $v_1$ or $v_2$ in its output. $k_3$ is user parameter which sets the maximum allowed lifetime. In another exemplary embodiment, $k_3 > k_2 > k_1$.

Based on the determined lifetimes, the list of faces is sorted by lifetime at block 420. In one embodiment, the lifetimes for the faces are sorted by descending order. As a result, an internal face list is determined.

Figure 5:
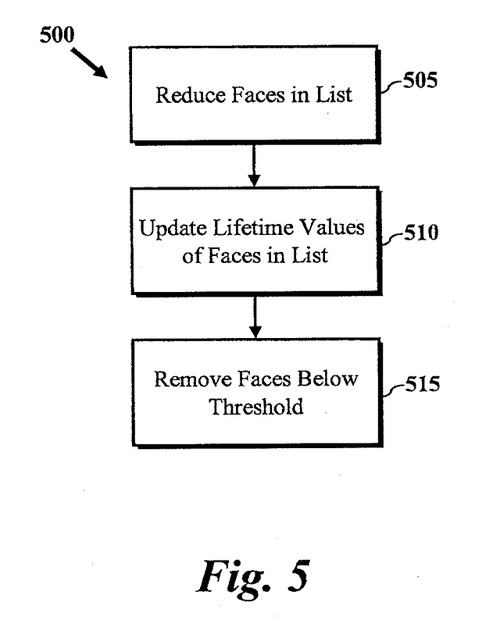
FIG. 5 depicts a process for updating an internal face list according to one embodiment of the invention.

FIG. 5 depicts a process for processing an internal face list. As previously described, reduction of a face list determined by a face detection unit can increase speed of face tracking according to one embodiment of the invention. Process 500 begins at block 505 by reducing the number of faces on the list. For example, a predefined number of faces is selected from the beginning of the list. For each face in the list, the lifetime value is adjusted at block 510 by reducing the lifetime value by one unit of time, or any other measurement that reduces the lifetime of the respective face. Faces in the list that have a lifetime value that is below a predefined threshold value are removed from the internal faces list at block 515. In that fashion, lifetime values of detected faces may be used to limit the number of faces on a list and improve processing speeds.

Figure 6:
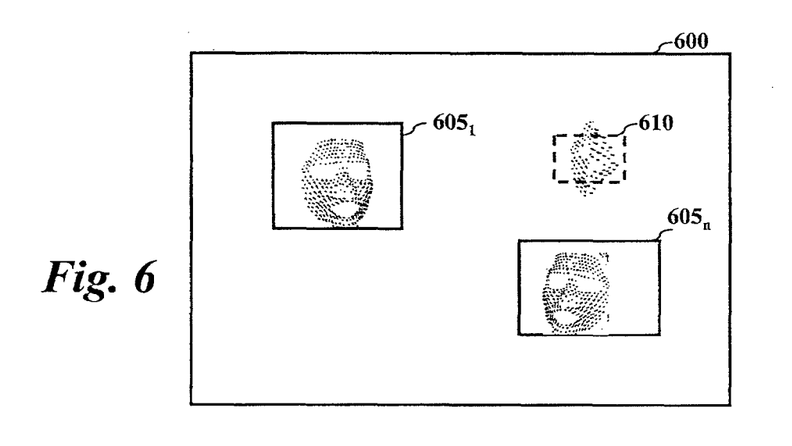
FIG. 6 depicts a graphical representation of a frame according to one embodiment of the invention.

FIG. 6 depicts a graphical representation of a frame according to one embodiment of the invention. Frame 600 may relate to at least one of an optical viewfinder, display of an imaging device, detection area, etc. In accordance with the face tracking system of the invention, a face detection unit may generate a plurality of windows 605$_{1-n}$, for one or more objects in a frame. Windows 605$_{1-n}$ may initially be determined by a face detection unit (e.g., FD 130) and tracked by a low power face tracking unit (e.g., LPFT 120). The windows may be associated with one or more faces on a face list. In certain embodiments, the face detection unit may create a window or entry on a face list for one or more false faces, according to one embodiment of the invention. Frame 600 further illustrates false face window 610 which may be detected and removed from a face detection list according to one or more embodiments of the invention.

The face tracking unit may process image data based on the scale and coordinates associated with one or more windows and faces of a face list. Display of windows 605$_{1-n}$ may also facilitate operation by a user of an imaging device for capture of images and/or setup of the imaging device. For example, windows 605$_{1-n}$ may illustrate the one or more focus regions of the imaging device. Windows 605$_{1-n}$ are illustrated as exaggerated regions in frame 600 for the purposes of illustration. The scale of windows 605$_{1-n}$ may be based on the scale of one or more faces. Thus, windows 605$_{1-n}$ may be displayed in accordance with scale of a face. It may also be appreciated that the plurality of windows may be employed for a particular face. In certain embodiments, windows 605$_{1-n}$ may be displayed as a single window while a face tracking unit processes a plurality of sub-windows within each window.

Figure 7A:
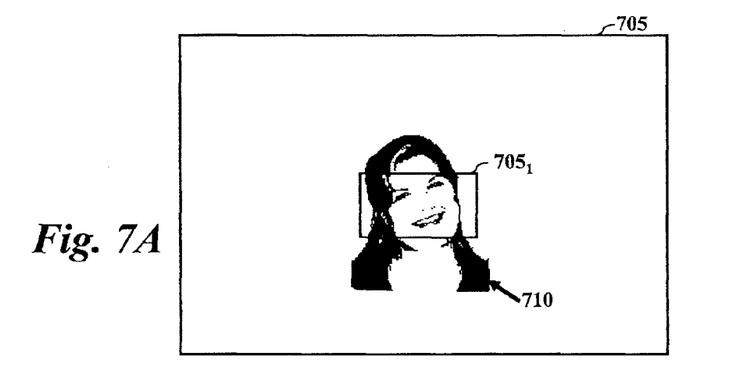
FIGS. 7A-7B depict graphical representations of low power face tracking according to one or more embodiments of the invention.
Figure 7B:
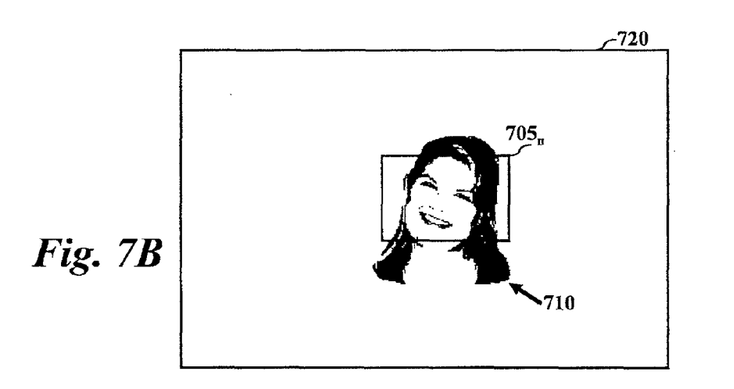

FIGS. 7A-7B depict graphical representations of low power face tracking according to one or more embodiments of the invention. FIG. 7A depicts a graphical representation of a frame including data for object 710. Object 710 may be detected by a face detection unit and added to a face list generated by the face detection unit. Thereafter, the low power face tracking system may be configured to perform face tracking as discussed in process of FIG. 4 including determining coordinates of the face and scale. Window 710₁ may be displayed by a processor of the imaging device within the frame.

FIG. 7B depicts a graphical representation of a second frame, frame 720. When second frame 720 is received by the face detection unit, a face list may be provided to the face tracking system. As discussed above with reference to FIG. 4, the face tracking system may stabilize motion and/or determine lifetime values based on coordinates and scale of window 710₁ and the detected face, thereby reducing processing time of second frame 720. In one embodiment, the posture, location and size are kept fixed between frames 705-720 or can be estimated as previously described in paragraph 19. The lifetime of the face may decrease by one in each frame. Thus, for example, if in frame 705 the lifetime of the face was 10 then it will be removed from the face list in frame 716.

In certain embodiments, frames 705 and 720 may not be consecutive. Accordingly, the face tracking system may be configured to process frame data while incorporating missing frame data. One embodiment of the process for filling in blanks is described earlier as shown in FIG. 1 and corresponding text in paragraph 19.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method of face tracking by an imaging device, comprising:
   receiving image data associated with a frame;
   receiving one or more face detection windows constrained to correspond to actual faces;
   determining a face list based on a lifetime value that is based on at least a detection confidence level for each face detection window, and a degree of confidence that each face in the face list is an actual face, a higher degree of confidence being based in part on a higher number of neighboring face detection windows for the same actual face;
   sorting the face list based on at least one lifetime value; and
   tracking one or more of the actual faces based on the sorted face list.

2. The method of claim 1, wherein tracking one or more of the actual faces comprises detecting an image based on at least one of coordinate and scale values of the one or more faces on the sorted face list.

3. The method of claim 1, wherein the at least one lifetime value is based in part on an amount of the degree of confidence.

4. The method of claim 1, further comprising deleting each face detection window that corresponds to at least one of a false positive of a non-face, a duplicate of a same face, or a lifetime value that is expired, based on the image data, wherein determining the face list is based on a lifetime value that is based on at least a detection confidence level for each face detection window that is undeleted.

5. The method of claim 1, wherein the image data relates to a preview image for a frame of the imaging device.

6. The method of claim 1, further comprising determining coordinate and scale values for one or more of the face detection windows.

7. The method of claim 1, further comprising determining the lifetime values for one or more of the face detection windows, wherein selecting the one or more faces from the face list is based in part on the determined lifetime values.

8. An apparatus for face tracking, comprising:
   a memory configured to store image data associated with a frame and one or more face detection windows constrained to correspond to actual faces; and
   an imaging processor operationally coupled to the memory and configured to:
      determine a face list based on a lifetime value that is based on at least a detection confidence level for each face detection window, and a degree of confidence that each face in the face list is an actual face, a higher degree of confidence being based in part on a higher number of neighboring face detection windows for the same actual face;
      sort the face list based on at least one lifetime value; and
      track one or more of the actual faces based on the sorted face list.

9. The apparatus of claim 8, wherein the imaging processor is configured to track one or more of the actual faces via detecting an image based on at least one of coordinate and scale values of the one or more faces on the sorted face list.

10. The apparatus of claim 8, wherein the at least one lifetime value is based in part on an amount of the degree of confidence.

11. The apparatus of claim 8, wherein the imaging processor is further configured to:
    delete each face detection window that corresponds to at least one of a false positive of a non-face, a duplicate of a same face, or a lifetime value that is expired, based on the image data; and
    determine the face list based on at least a detection confidence level for each face detection window that is undeleted.

12. The apparatus of claim 8, wherein image data relates to a preview image for a frame of the apparatus.

13. The apparatus of claim 8, wherein the imaging processor is further configured to determine coordinate and scale values for one or more of the face detection windows.

14. The apparatus of claim 8, wherein the imaging processor is further configured to:
    determine the lifetime values for one or more of the face detection windows; and
    select the one or more faces from the face list is based in part on the determined lifetime values.

15. An apparatus for face tracking, comprising:
    means for receiving image data associated with a frame;
    means for receiving one or more face detection windows constrained to correspond to actual faces;
    means for determining a face list based on a lifetime value that is based on at least a detection confidence level for each face detection window, and a degree of confidence that each face in the face list is an actual face, a higher degree of confidence being based in part on a higher number of neighboring face detection windows for the same actual face;
    means for sorting the face list based on at least one lifetime value; and
    means for tracking one or more of the actual faces based on the sorted face list.

16. The apparatus of claim 15 wherein the means for tracking one or more of the actual faces comprises means for detecting an image based on at least one of coordinate and scale values of the one or more faces on the sorted face list.

17. The apparatus of claim 15, wherein the at least one lifetime value is based in part on an amount of the degree of confidence.

18. The apparatus of claim 15, further comprising means for deleting each face detection window that corresponds to at least one of a false positive of a non-face, a duplicate of a same face, or a lifetime value that is expired, based on the image data, wherein the means for determining comprises means for determining the face list based on at least a detection confidence level for each face detection window that is undeleted.

19. The apparatus of claim 15, further comprising:
means for determining the lifetime values for one or more of the face detection windows; and
means for selecting the one or more faces from the face list based in part on the determined lifetime values.

20. A non-transitory computer readable medium comprising instructions that when executed on a processor comprising computer hardware cause the processor to:
receive image data associated with a frame;
receive one or more face detection windows constrained to correspond to actual faces;
determine a face list based on a lifetime value that is based on at least a detection confidence level for each face detection window, and a degree of confidence that each face in the face list is an actual face, a higher degree of confidence being based in part on a higher number of neighboring face detection windows for the same actual face;
sort the face list based on at least one lifetime value; and
track one or more of the actual faces based on the sorted face list.

* * * * *